Patented Mar. 26, 1935

1,995,319

UNITED STATES PATENT OFFICE 1,995,319

RUBBER COMPOSITION AND METHOD OF MAKING THE SAME

Edward Arthur Murphy, Erdington, Birmingham, Frank Theodore Purkis, Moseley, and Douglas Frank Twiss, Wylde Green, England, assignors to Dunlop Rubber Company, Ltd., Erdington, Birmingham, England, a corporation of Great Britain No Drawing. Application January 27, 1932, Serial No. 589,306. In Great Britain February 11, 1931

10 Claims. (Cl. 134—17)

This invention relates to the production of compositions of or containing rubber or the like from aqueous dispersions of the kinds hereinafter specified.

The object of the invention is to produce, from aqueous dispersions of rubber or the like, a composition comprising rubber dispersed or dissolved in a rubber solvent and the water of the constituent aqueous dispersion dispersed therein as the disperse phase. The composition is particularly suitable as adhesive for organic materials such as rubber, textiles, and leather.

According to the present invention the aforesaid compositions are produced by admixing an aqueous dispersion of rubber or the like with an aqueous emulsion of a rubber solvent. This may be done either in the absence of a stabilizing agent or in the presence of such a quantity thereof as to allow the ultimate coagulation of the aqueous dispersion to take place. The aqueous medium is then converted into the disperse phase and the rubber solvent into the continuous phase either with or without the presence of a precipitant or coagulant agent.

Suitable precipitant or coagulant agents are for instance an alcohol of low molecular weight such as methyl, ethyl or propyl alcohol, or acetone, or mixtures of these with one another or with other liquids such as ether, petroleum naphtha, benzene and carbon tetrachloride.

According to an embodiment of the invention the compositions can be prepared by mixing a rubber solvent such as coal tar naphtha with a rubber latex in the presence of sufficient protective colloids to prevent the solvent coagulating the latex, but insufficient to prevent coagulation taking place upon the addition of a precipitant agent such as alcohol or acetone.

The addition of the alcohol to the latex containing the rubber solvent, which is already uniformly mixed with the latex causes uniform coagulation and swelling of the coagulum. After a short period of stirring a viscous rubber dough or solution is obtained in which the water is present as a disperse phase.

It has been found that the inversion is aided by frothing the latex before or after the addition of the solvent or solvent-dispersion precipitant agent.

The emulsions or dispersions of rubber or the like comprise those consisting of or containing rubber, gutta-percha, balata or similar vegetable resins occurring naturally or artificially obtained. Such artificial aqueous dispersions may include those of coagulated rubber, vulcanized rubber, synthetic rubber, waste or reclaim.

If desired, any of the aforementioned dispersions may be used alone or in admixture with one another.

Any of the aforesaid dispersions may contain the usual known compounding and vulcanizing ingredients and/or may be in concentrated form. Examples of compounding ingredients are for instance whiting, carbon black, and granular, fibrous or divided materials such as leather fibre, asbestos fibre, wood pulp, wood flour, jute fibre, cotton flock, paper pulp, abrasives, rubber crumb and cork.

Concentrates such as are obtained in British Patent Number 219,635, or copending Patent No. 1,864,164, February 23, 1932 to which may be added any one or more of the usual compounding ingredients, may also be used.

The following is an example of an adhesive composition according to the invention.

Example 100 grams of frothed latex concentrated by centrifugalization to 60% concentration, and containing 1 gram of ammonium oleate, are poured slowly into 600 grams of coal tar naphtha being at the same time vigorously agitated in a frothing machine.

The agitation is continued while 300 grams of a mixture of equal parts of alcohol (methylated spirits) and of coal tar naphtha are slowly added; a marked increase in viscosity takes place and a viscous dough or solution with the water present as a disperse phase is obtained.

Having now particularly described and ascertained the nature of our said invention in what manner the same is to be performed, we declare that what we claim is:—

1. A method for the production of an adhesive unmasticated rubber solution which comprises admixing a rubber solvent with an aqueous dispersion of rubber to form dispersed rubber particles and emulsified solvent in a mixed dispersion throughout the aqueous dispersing medium, coagulating and swelling said rubber and solvent in admixture, and inverting the dispersion to convert the resulting rubber solution into a continuous phase.

2. A method as claimed in claim 1 wherein the admixture is effected in the presence of a precipitant agent.

3. A method as claimed in claim 1 wherein the admixture is effected in the presence of an alcohol of low molecular weight.

4. A method as claimed in claim 1 wherein the admixture is effected in the presence of acetone.

5. A method as claimed in claim 1 wherein an amount of protective colloid is employed in sufficient quantity to prevent coagulation on the primary addition of the solvent, but insufficient to prevent coagulation taking place upon the subsequent addition of a precipitant.

6. A method as claimed in claim 1 where the admixture is stirred.

7. A method as claimed in claim 1 wherein the aqueous dispersions are frothed.

8. A method of forming an adhesive which comprises mixing a frothed concentrated rubber latex, containing a small percentage of ammonium oleate, slowly with a hydrocarbon solvent with vigorous agitation and frothing, and adding a mixture of alcohol and hydrocarbons while continuing said agitation.

9. The method of claim 1 in which the admixing of the rubber solvent with the aqueous dispersion is by mixing an emulsion of solvent formed separately from the rubber dispersion with the rubber dispersion.

10. The method of claim 1 in which the quantity of solvent is much greater than the quantity of dispersed rubber.

EDWARD ARTHUR MURPHY.
FRANK THEODORE PURKIS.
DOUGLAS FRANK TWISS.